US009013060B2

(12) United States Patent
Katru et al.

(10) Patent No.: US 9,013,060 B2
(45) Date of Patent: Apr. 21, 2015

(54) METHOD AND SYSTEM FOR MEASURING, MONITORING AND CONTROLLING ELECTRICAL POWER CONSUMPTION

(75) Inventors: Siva Prasad Katru, Guntur (IN); Kumar Padmanabh, Gorakhpur (IN); Sanjoy Paul, Bangalore (IN)

(73) Assignee: Infosys Limited (IN)

( * ) Notice: Subject to any disclaimer, the term of this patent is extended or adjusted under 35 U.S.C. 154(b) by 924 days.

(21) Appl. No.: 12/814,747

(22) Filed: Jun. 14, 2010

(65) Prior Publication Data
US 2011/0266869 A1 Nov. 3, 2011

(30) Foreign Application Priority Data
Apr. 30, 2010 (IN) .............................. 1212/CHE/2010

(51) Int. Cl.
*H02J 3/14* (2006.01)
*H02J 13/00* (2006.01)

(52) U.S. Cl.
CPC .............. *H02J 3/14* (2013.01); *H02J 13/0075* (2013.01); *Y02B 70/3225* (2013.01); *Y02B 70/3266* (2013.01); *Y04S 20/222* (2013.01); *Y04S 20/242* (2013.01); *Y02B 90/2653* (2013.01); *Y04S 40/126* (2013.01)

(58) Field of Classification Search
CPC ........ H02J 3/14; H01R 13/6675; H02H 9/001
USPC ....................................... 307/11, 38–39, 131
See application file for complete search history.

(56) References Cited

U.S. PATENT DOCUMENTS

| 4,689,493 | A | * | 8/1987 | Nozick et al. ................. 307/147 |
| 5,237,264 | A | * | 8/1993 | Moseley et al. ............... 323/324 |
| 5,621,627 | A | * | 4/1997 | Krawchuk et al. ............... 363/37 |
| 5,636,288 | A | * | 6/1997 | Bonneville et al. ........... 381/110 |
| 5,754,036 | A | * | 5/1998 | Walker .......................... 323/237 |
| 5,949,158 | A | * | 9/1999 | Schulz .......................... 307/127 |
| 6,043,642 | A | * | 3/2000 | Martin et al. ................. 324/142 |
| 6,172,885 | B1 | * | 1/2001 | Feldtkeller ................... 363/21.1 |
| 6,225,760 | B1 | * | 5/2001 | Moan ............................. 315/360 |
| 6,392,422 | B1 | * | 5/2002 | Kammer et al. .............. 324/650 |
| 6,541,954 | B1 | * | 4/2003 | Gluszek ........................ 324/107 |
| 6,590,752 | B1 | * | 7/2003 | Schaper et al. ................. 361/23 |
| 6,762,570 | B1 | * | 7/2004 | Fosler ........................... 315/312 |
| 6,798,627 | B2 | * | 9/2004 | Schultz et al. .................. 361/20 |
| 6,903,533 | B1 | * | 6/2005 | Geren et al. .................. 320/134 |
| 7,199,699 | B1 | * | 4/2007 | Gidge ........................ 340/12.32 |

(Continued)

*Primary Examiner* — Jared Fureman
*Assistant Examiner* — Alfonso Perez Borroto
(74) *Attorney, Agent, or Firm* — Lerner, David, Littenberg, Krumholz & Mentlik, LLP

(57) ABSTRACT

A system and method for measuring, monitoring and controlling electrical power directed through one or more electricity directing devices is provided. The one or more electricity directing devices includes electrical sockets supplying power to one or more devices. The system includes a potential transformer configured to receive AC voltage directed through a socket and further configured to relay the voltage to a processing device. The system further includes a current sensor configured to sense current drawn from the socket and further configured to relay the current to the processing device. A microcontroller is adapted to receive analog or digital values of voltage and current corresponding to AC voltage and AC current. The microcontroller then measures values of voltage and current, calculate electrical power consumed and generate a control signal. The control signal activates a switching device operationally connected to the socket and switches power flow through the socket.

27 Claims, 5 Drawing Sheets

(56) References Cited

U.S. PATENT DOCUMENTS

| | | | |
|---|---|---|---|
| 7,460,347 B2* | 12/2008 | Schweitzer et al. | 361/62 |
| 7,602,628 B2* | 10/2009 | Kirk et al. | 363/123 |
| 7,603,184 B2* | 10/2009 | Walters et al. | 700/17 |
| 8,427,131 B2* | 4/2013 | Bryson et al. | 323/343 |
| 2002/0077729 A1* | 6/2002 | Anderson | 700/291 |
| 2003/0080876 A1* | 5/2003 | Martin | 340/870.02 |
| 2003/0147186 A1* | 8/2003 | Schultz et al. | 361/15 |
| 2004/0140777 A1* | 7/2004 | Fosler | 315/363 |
| 2005/0033707 A1* | 2/2005 | Ehlers et al. | 705/412 |
| 2006/0091877 A1* | 5/2006 | Robinson et al. | 324/76.11 |
| 2006/0193099 A1* | 8/2006 | Schweitzer et al. | 361/115 |
| 2006/0235632 A1* | 10/2006 | Iaquinangelo | 702/64 |
| 2006/0250117 A1* | 11/2006 | Rayburn | 323/209 |
| 2007/0171687 A1* | 7/2007 | Kogel et al. | 363/49 |
| 2007/0283521 A1* | 12/2007 | Foster et al. | 15/314 |
| 2008/0030916 A1* | 2/2008 | Kahrimanovic et al. | 361/149 |
| 2008/0042683 A1* | 2/2008 | Kasztenny et al. | 324/772 |
| 2008/0042711 A1* | 2/2008 | Kirk et al. | 327/190 |
| 2009/0234512 A1* | 9/2009 | Ewing et al. | 700/295 |
| 2010/0007522 A1* | 1/2010 | Morris | 340/870.02 |
| 2010/0070217 A1* | 3/2010 | Shimada et al. | 702/62 |
| 2010/0090534 A1* | 4/2010 | Federmann et al. | 307/66 |
| 2010/0235144 A1* | 9/2010 | Mosberger-Tang | 702/188 |
| 2010/0265743 A1* | 10/2010 | Joshi | 363/84 |
| 2010/0318238 A1* | 12/2010 | Bryson et al. | 700/298 |
| 2011/0063759 A1* | 3/2011 | Billingsley et al. | 361/1 |
| 2011/0074382 A1* | 3/2011 | Patel | 324/76.11 |
| 2011/0095608 A1* | 4/2011 | Jonsson et al. | 307/39 |
| 2011/0109171 A1* | 5/2011 | Capano | 307/126 |
| 2011/0210717 A1* | 9/2011 | Hilton et al. | 324/66 |
| 2012/0084579 A1* | 4/2012 | Izquierdo et al. | 713/300 |
| 2013/0043880 A1* | 2/2013 | Bettenwort et al. | 324/509 |

* cited by examiner

METHOD AND SYSTEM FOR MEASURING, MONITORING AND CONTROLLING ELECTRICAL POWER CONSUMPTION

BACKGROUND OF THE INVENTION

The present invention relates generally to the field of electrical power control. More particularly, the present invention is directed towards measuring, monitoring and controlling electrical power consumption at power consumption points.

Electrical power consumption in residential or industrial units is measured using electricity meters. In order to save power costs as well as for environmental benefits such as reducing greenhouse gas emissions, businesses as well as residents are resorting to techniques for accurately measuring and monitoring power consumption. An electricity meter is an instrument for measuring electricity consumption. Various techniques for measuring electricity consumption are known in the art. In one of the techniques, electricity consumption may be measured by measuring instantaneous value of voltage and current to calculate the instantaneous value of power consumed. However, electricity meters measure power consumption in a group of devices, where the group of devices are installed either in residential or commercial premises.

Electricity meters are only configured to measure power consumption, not to control or limit it. Typically electricity meters measure electricity consumed by group of devices located in one premises. For controlling and limiting power consumption accurately, a method for granular measurement of power at individual power points is needed. Based on the granular measurement, means for controlling the operation of devices connected to power points needs to be realized, so that consumption at individual power points can be restricted. Moreover, for controlling and restricting power consumption over a larger area having multiple power points, a way to network the communication of power values is desired.

In the light of the above, there exists a need to devise a method of achieving individual as well as aggregate power control at power consumption points. Further, a centralized system for monitoring and controlling power consumption in a facility having multiple power points is needed.

BRIEF SUMMARY OF THE INVENTION

A method and system for measuring, monitoring and controlling electrical power directed through one or more electricity directing devices is provided. In various embodiments of the present invention, the one or more electricity directing devices comprises one or more electrical sockets supplying power to one or more devices. The system of the invention comprises one or more circuits. Each circuit comprises a potential transformer configured to receive AC voltage directed through a socket and further configured to relay the voltage to a processing device for measuring electrical power. Relaying the AC voltage comprises stepping down the voltage using a precise value of transformation ratio. The system further comprises a current sensor configured to sense current drawn from the socket and further configured to relay the current to the processing device. The processing device includes a microcontroller which is configured to receive analog or digital values of voltage and current corresponding to AC voltage delivered by the potential transformer and current sensed by the current sensor. The microcontroller is further configured to measure values of voltage and current, calculate electrical power consumed and generate a control signal. The microcontroller is connected to a coupling device configured to transmit the generated control signal to a switching device. The switching device is operationally connected to the socket and is configured to switch power flow through the socket based on the received control signal.

In various embodiments of the present invention, digital values of voltage and current received by the microcontroller are generated by an analog to digital controller located in a signal conditioning circuit. The signal conditioning circuit is operationally connected to the potential transformer and the current sensor. The signal conditioning circuit is configured to condition the analog AC voltage and current in order to make it suitable for measurement and further processing by the microcontroller. Conditioning the analog AC voltage comprises performing operations such as amplification, attenuation, isolation, filtering, excitation and linearization on the analog AC voltage and current.

In various embodiments of the present invention, analog values of voltage and current received by the microcontroller are delivered by a signal conditioning circuit. The microcontroller comprises an analog to digital converter configured to convert analog values of voltage and current into digital values.

In various embodiments of the present invention, calculating electrical power by the microcontroller includes the steps of calculating a power factor value and values of real, apparent and reactive power.

In various embodiments of the present invention, the system of the invention further includes an AC/DC power supply unit configured to supply power to components of the microcontroller.

In an embodiment of the present invention, the coupling device configured to transmit control signal generated by the microcontroller to a switching device is an Optocoupler. Examples of switching device include but are not limited to, a TRIAC and a power relay.

In various embodiments of the present invention, one or more circuits for measuring, monitoring and controlling electrical power are embedded in a power strip comprising one or more electrical sockets. Each circuit is configured to measure, monitor and control electrical power flow through corresponding electrical socket.

In an embodiment of the present invention, the power strip includes a rules engine. The rules engine includes software code containing rules identifying one or more devices to be switched off based on control signals generated by the one or more circuits. Rules for switching the one or more devices include instructions for switching different devices at different time periods during a day. In another embodiment of the present invention, the rules engine allocates a power budget to the power strip and switches the one or more devices in case of the electrical power exceeding the power budget threshold.

In an embodiment of the present invention, the power strip is configured to transmit calculated values of power to a server comprising a rules engine. The server is configured to control switching of the one or more devices based on rules stored in the rules engine. In another embodiment of the present invention, the power strip comprises additional circuitry for switching the one or more devices through a web based interface.

In various embodiments of the present invention, the one or more circuits are embedded in a plurality of power strips comprising the one or more electrical sockets. The plurality of power strips are configured to communicate with each other for maintaining a software policy for power consumption.

In various embodiments of the present invention, the system of the present invention includes a centralized server operationally connected to the microcontroller and configured to receive digital values of voltage and current from the microcontroller in order to calculate a power factor value and values of real, active and reactive power.

In various embodiments of the present invention, the microcontroller is configured to wirelessly transmit calculated power values through a wireless device. The wireless device is adapted to remotely control switching of the one or more devices through text messaging. In an embodiment of the present invention, the system of the invention includes an authentication mechanism for allowing remote control of switching of the one or more devices through specific mobile device numbers.

In other embodiments of the present invention, the microcontroller is operationally connected to a computing device configured to control switching of the one or more devices through wireline connections.

In certain embodiments of the present invention, the one or more electricity directing devices through which electrical power is directed are installed in an infrastructure facility. The infrastructure facility is an organization including one or more physical regions. One or more priority values may be assigned to the one or more physical regions for switching the one or more devices. Priority values are further assigned to devices within a physical region for switching the devices based on the priority values.

In various embodiments of the present invention, the microcontroller is configured to perform fault diagnosis on the one or more devices. Fault diagnosis is performed by analyzing presence of higher harmonic frequencies in the AC voltage received by the potential transformer.

In an embodiment of the present invention, the system for measuring, monitoring and controlling electrical power directed through one or more electricity directing devices connected in each phase of a 3-phase power supply include a circuit in each phase comprising a potential transformer configured to receive AC voltage directed through a socket and further configured to relay the voltage to a processing device for measuring electrical power. Relaying the AC voltage comprises stepping down the voltage using a precise value of transformation ratio. The circuit further comprises a current sensor configured to sense current drawn from the socket and further configured to relay the current to the processing device. Moreover, the circuit comprises a coupling device configured to transmit a control signal to a switching device configured to perform switching of power flow. The circuit also comprises a switching device operationally connected to the socket and configured to switch power flow through the socket based on the received control signal. The system of the present invention includes a microcontroller configured to receive digital values of voltage and current corresponding to AC voltage delivered by potential transformer in each phase and current sensed by the current sensor in each phase. The microcontroller is configured to measure values of voltage and current, calculate electrical power consumed and generate a control signal to be supplied to a coupling device in circuit of each phase.

In various embodiments of the present invention, a method for measuring, monitoring and controlling electrical power directed through one or more electricity directing devices includes receiving AC voltage through an electricity directing device, receiving AC current through the electricity directing device, converting values of AC voltage and current into digital values, calculating real, apparent and reactive power values based on the values of voltage and current and generating control signals for controlling switching of the one or more devices.

In an embodiment of the present invention, the generated control signals are transmitted wirelessly to enable remote control of switching of the one or more devices. In another embodiment of the present invention, the generated control signals are provided to a computing device for physically controlling switching of the one or more devices.

BRIEF DESCRIPTION OF THE DRAWINGS

The present invention is described by way of embodiments illustrated in the accompanying drawings wherein.

DETAILED DESCRIPTION

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purpose of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
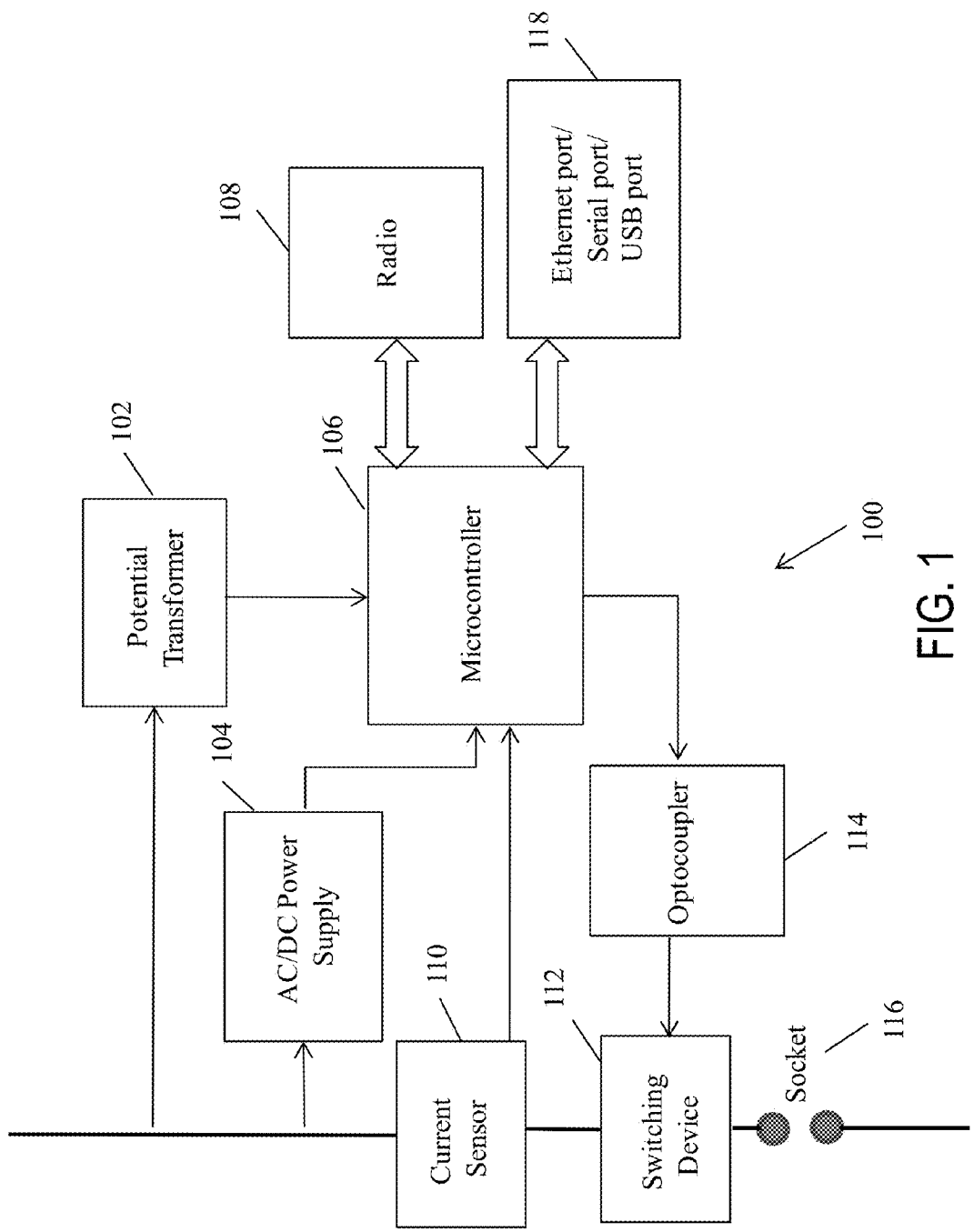
FIG. 1 is a schematic diagram illustrating components of a circuit for measuring, monitoring and controlling electrical power consumption.

FIG. 1 is a schematic diagram illustrating components of a circuit 100 for measuring, monitoring and controlling electrical power consumption. The system and method of the present invention utilizes an approach of employing an electrical circuit for measuring values of voltage and current relayed through electricity directing devices. Electricity directing devices are installations in industrial and residential environments comprising slots or holes that receive electricity through distribution lines and direct the electricity to one or more appliances that operate using electricity. Examples of electricity directing devices include, but are not limited to, wall sockets, power outlets, power points etc. The system and method of the present invention is adapted to employ electrical circuits for measuring values of voltage and current relayed through an electric switchboard. Further, system and method of the present invention is configured to measure power factor. Power factor is defined as ratio of real power flowing to load to apparent power. Real Power is power actually dissipated by load whereas apparent power is power supplied by the source. Real power is less than power supplied by the load, since some part of power supplied can not be used and gets wasted as reactive power by elements such as inductors and capacitors. For the purpose of measuring power values, multiple samples of voltage and current are taken by a microcontroller in one full cycle of Alternating Current (AC) power supplied by distribution lines. Thereafter, instantaneous power values are calculated at all the sampling points by the microcontroller. Cumulative sum of instantaneous values of power over one cycle is the "active power" or "real power", whereas summation of modulus of instantaneous power over one cycle is "apparent power" or "total power". Typically, an appliance operating on electricity is connected to such electricity directing devices using power chords or power plugs. The circuit 100 is configured to measure and continuously monitor power consumed by one or more appliances connected to a socket. In an embodiment of the present invention, the circuit 100 is directly connected to a socket. In other embodiments of the present invention, the circuit 100 is embedded inside a power strip or an electrical switchboard and measures power consumed by the power strip. A power strip is an electrical device having multiple sockets for plugging in multiple electrical devices. The power strip contains a cable at one end that connects to an electrical socket housed in a wall. Following the determination of power consumed, the circuit 100 is configured to control the operation of one or more appliances connected to the socket in order to limit power consumption beyond a particular limit.

As shown in the figure, the circuit 100 comprises a Potential Transformer 102, an AC/DC power supply 104, a microcontroller 106, a Radio 108, a current sensor 110, a Switching Device 112, an Optocoupler 114 and an Ethernet port/Serial port/USB port module 118. In an embodiment of the present invention, the circuit 100 is connected to a socket 116 and measures power consumed through it. The socket 116 may be an independent wall socket or one of multiple sockets housed in a power strip. The basic methodology in measuring, monitoring and controlling electrical power consumption includes sampling and recording values of voltage and current from the socket 116 and using these values to calculate values of power consumed. The Potential Transformer 102 is an electrical device that accurately relays Alternating Current (AC) voltages supplied through the socket. Typically, a potential transformer is designed to present minimal load to the voltage being measured. This is achieved by maintaining a precise value of transformation ratio between primary and secondary windings. Further, usually a step down transformer is used as the Potential Transformer 102 since the stepped down value can be easily utilized by a voltage measuring instrument for measuring the primary voltage. An example of a step-down transformer is a 230V/9V transformer. Output from the step-down transformer is provided to the microcontroller 106 through a signal conditioning circuit. The signal conditioning circuit (not shown in the figure) is a circuit configured to condition the analog voltage signal received from the Potential Transformer 102 and the analog current signal received from the current sensor 110 in order to make the signals suitable for measurement and further processing. In an embodiment of the present invention, one of the critical components of the signal conditioning circuit is an Analog-to-Digital (A/D) converter. Converting the analog signal into a digital signal is necessary before relaying the signal to the microcontroller 106. A digital signal can be easily processed by the microcontroller 106 for measuring the signal and applying it further to control other operations related to limiting power consumed through the socket 116.

Prior to converting the analog signal into digital format, the analog signal may be conditioned by operations that may include, without limitation, amplification, attenuation, isolation, filtering or linearization of the signal. One or more of the aforementioned conditioning operations are performed on the analog signal received from the Potential Transformer 102. Amplification and attenuation of the signal includes modifying the voltage level of the signal in order to match the signal with the A/D converter range. Isolation is an operation performed in order to relay a signal without physical connections so that interferences such as voltage surges and common mode voltages are avoided. In an embodiment of the present invention, signal conditioning is carried out in one part of the circuit so that it can give feed to other part of the circuit in right format. The signal conditioning operations may include filtering, converting current values into voltage values and vice versa. These operations may also be carried out by deploying special circuits for them.

Following the execution of digitization and other signal conditioning operations, voltage signal received from the Potential Transformer 102 is provided to the microcontroller 106. For the purposes of the present invention, the conditioned voltage is used to calculate real, apparent and reactive power values by the microcontroller 106.

An AC/DC power supply unit 104 is configured to supply power to all components of the circuit 100 and the microcontroller 106. In an embodiment of the present invention, the AC/DC power supply unit 104 draws voltage from the socket 116 and then steps down the voltage in order to supply it to the microcontroller 106. In an example, the AC/DC power supply unit 104 utilizes a low form factor transformer to step down the voltage.

The current sensor 110 is configured to sense value of current drawn from the socket 116. This current value is then relayed to the microcontroller 106 which uses this value along with the value of voltage provided by the Potential Transformer 102 to calculate the values of real, apparent and reactive power.

Apparent power is value of power applied to an appliance which is calculated by using instantaneous values of voltage and current supplied by the socket 116, whereas real power is the power actually consumed by an appliance. The power consumed by an appliance is different from the power supplied by the socket. This is because voltage supplied by the socket may be out of phase with current supplied. In such a case, an equation that signifies relationship between real power and apparent power can be illustrated by:

$$\text{Real Power}(P) = \text{cosine (phase)} * \text{Apparent Power} \quad (1)$$

In the above equation, phase is the phase angle difference between voltage and current supplied by the power supply through the socket. In an example, the phase angle difference may be 45 degrees. Assuming, the apparent power supplied is 230 volt-ampere, then Real power consumed by the load would be cosine (45)*230=0.5*230=115 VA. Reactive power is the portion of power that is returned to the source in each cycle. The equation below illustrates the relationship between "Reactive Power" and "Apparent Power":

$$\text{Reactive Power} = \text{sine (phase)} * \text{Apparent Power} \quad (2)$$

In various embodiments of the present invention, the calculated power values are then used to control one or more appliances connected to the socket 116 in order to limit power consumption through the socket 116.

In various embodiments of the present invention, the microcontroller 106 calculates real, apparent and reactive power values using software code. A power factor value is determined which signifies phase lag between voltage and current provided at the power source. An apparent power value is then calculated by determining cumulative sum of modulus of instantaneous power values over one cycle. Thereafter, active or real power value is calculated by using the equation:

Active Power=Power Factor*Apparent Power (3)

Based on the calculation of apparent power and active power, a reactive power value is determined by the following equation:

Reactive Power=Apparent Power−Active Power (4)

In an embodiment of the present invention, the microcontroller 106 is operationally connected to an Optocoupler 114. An Optocoupler is a device that electrically isolates transmitter and receiver of an electrical signal so that electrical noise at the transmitter is not relayed to the receiver. This is done by converting electrical signal at the transmitter into an optical signal and using an optical transmission path for transmitting the electrical signal. In an example, the optical transmission path is air. In another example, the optical transmission path is optical fiber. The Optocoupler 114 used in the present invention is a device used for electrically isolating the analog electrical signal output by the microcontroller 106 and providing the signal to the socket 116. In an exemplary embodiment, the Optocoupler 114 includes a Light Emitting Diode (LED) (not shown in the figure), electrically isolated from the Switching Device 112. The analog electrical signal output by the microcontroller 106 activates the LED of the Optocoupler 116, which in turn illuminates the Switching Device 112. In an embodiment of the present invention, the Switching Device 112 is a TRIAC. A TRIAC is an electronic switch composed of two Silicon Controlled Rectifiers (SCRs) connected in parallel and inverse in polarity to each other. The Switching Device 112 is capable of conducting current in either direction and is switching 'ON' or 'OFF' the power flow through the socket 116. Based on the measurement of power values, a control signal can be generated by the microcontroller 106, which triggers the Optocoupler 114, which in turn activates the Switching Device 112 that cuts off power from the socket 116. Thus, the analog electrical signal output by the microcontroller 106 is a control signal which can be used to limit power consumption beyond a particular limit. In an embodiment of the present invention, the Switching Device 112 is a power relay. A power relay is an electromagnetic switch configured to turn power flow 'ON' or 'OFF' through the socket 116 based on control signal received from the microcontroller 106.

In an embodiment of the present invention, the microcontroller 106 is configured to perform fault diagnosis on one or more devices connected to the socket 116. The fault diagnosis is performed by analyzing presence of higher harmonic frequencies in the AC voltage received by the potential transformer. In case of no fault in any of devices connected to the socket 116, the AC voltage sensed by the potential transformer would have only one fundamental frequency. However, in case of a faulty device, the AC voltage supplied to the device would suffer a distorted potential drop instead of having a perfectly sinusoidal potential drop. This will result in the distorted AC voltage single having other harmonic frequencies present. Identifying the presence of harmonic frequencies is a method to ensure presence of faulty devices. In an embodiment of the present invention, presence of harmonic frequencies is identified by taking Fourier Transform of the AC voltage signal by the microcontroller 106. The transformed signal would then be probed for detecting presence of harmonic frequencies of higher value, which in turn would confirm presence of faulty devices.

In addition to controlling power consumption through the socket 116, power consumption can be controlled through a power strip consisting of multiple sockets including the socket 116. Multiple units of the circuit 100 are connected to the power strip, wherein each unit corresponds to a socket. Each unit of the circuit 100 operates as described above. The power strip includes circuitry inside the strip that receives calculated values of power from multiple units of the circuit 100. In an embodiment of the present invention, rule engine based control of power consumption is performed. Rule engine is a piece of software code that executes various business logic defined by an application. Business logic essentially executes various state machine operations that control power consumption in the power strip according to certain rules. An example of rule engine includes allocating power budget attached with the power strip. In an embodiment of the present invention, rule engine may be embedded inside the power strip. In another embodiment of the present invention, rule engine may be embedded in a server. According to the power budget, once consumed power through the power strip crosses the threshold of power budget, one or more devices connected to sockets in the power strip are switched off according to rules defined in the rules engine. The rule engine defines rules identifying devices to be switched off. In an exemplary embodiment of the present invention, devices to be switched off may be different for different time of day. In an embodiment of the present invention, the power strip includes additional circuitry for turning 'ON' or turning 'OFF' one or more devices connected to the power strip through a web based interface. In another embodiment of the present invention, the power strip is configured to transmit the calculated values of power to a server. The server is then configured to control switching of the one or more devices connected to sockets in the power strip. In yet another embodiment of the present invention, the system of the invention includes multiple power strips that are operationally connected to each other. In addition to maintaining a rules engine for a power strip, multiple power strips connected to each other can communicate with each other in order to maintain a software policy for power consumption. In yet another embodiment of the present invention, the power strips are networked with each other using wired or wireless protocols. An example of a wired network for networking the power strips may include the Ethernet and an example of a wireless network may include an 802.11 wireless Local Area Network (LAN). In yet another embodiment of the present invention, the power strips are networked using a combination of wired and wireless networks. In an example, the networked power strips implement a common rule engine business logic for controlling switching of one or more devices connected to the power strips.

In various embodiments of the present invention, the circuit 100 comprises a centralized server. The centralized server is operationally connected to the microcontroller 106. Further, the centralized server receives digital values of voltage and current from the microcontroller 106 and contains rule engine based business logic for calculating a power factor value and values of real, active and reactive power. In an embodiment of the present invention, the centralized server implements a state machine that sends commands via multiple channels of communication to an intelligent power strip comprising multiple devices for switching one or more devices plugged into multiple sockets of the power strip.

In various embodiments of the present invention, a hybrid control mechanism can be implemented which is a combination of individual control within a power strip, distributed control among multiple power strips and a centralized server or control through a centralized server.

In various embodiments of the present invention, the microcontroller 106 is connected to an electronic device such as a computer or a processor. The microcontroller 106 relays the power values to the processor. The processor is in turn connected to the one or more appliances coupled to the socket 116 and controls the switching of the one or more appliances based on a pre-determined power consumption value. The system of the invention uses an authentication mechanism to allow control of appliances through only specific Internet Protocol (IP) addresses. In other embodiments of the present invention, the microcontroller 106 is connected to other Input-Output peripherals such as serial ports, Universal Serial Bus (USB) ports, Ethernet ports which are in turn connected to the one or more appliances to be controlled.

In other embodiments of the present invention, the microcontroller 106 wirelessly transmits calculated power values through a wireless device such as the Radio 108. Examples of Radio 108 include a wireless device conforming to communication protocols such as Bluetooth, WiFi, Zigbee etc. The power values are transmitted to a mobile device. The mobile device then remotely controls the switching of the one or more appliances through text messaging. The system of the invention uses an authentication mechanism to allow remote control of appliances through only specific mobile device numbers.

In other embodiments of the present invention, the microcontroller 106 is connected to a port such as an Ethernet port or a Serial port or a USB port 118.

In various embodiments, the system of the present invention is used to measure, monitor and control power consumption through an electric switchboard. The circuit illustrated in FIG. 1 is embedded inside an electric switchboard. The components shown in the figure operate in the manner described above to measure, monitor and limit power consumption through the electric switchboard.

In certain embodiments, the system of the present invention is used to measure, monitor and control power consumption in an infrastructure facility comprising multiple power points. Examples of an infrastructure facility include an organization, a building, a residential colony, a business establishment, a hospital etc. Multiple circuits of the system of the invention illustrated in FIG. 1 are used to measure, monitor and control power consumption within multiple areas in an infrastructure facility. The multiple circuits are then connected to a server that is configured to control switching of appliances within the infrastructure facility. The system of the present invention can be configured to hierarchically assign priorities to one or more areas within an organization. For example, a medical center within an organization may have a higher priority than cafeteria. Consequently, once power consumption in an organization is calculated using multiple circuits, appliances within a priority center such as a cafeteria are turned OFF first compared to a higher priority center such as the medical center. Further, one or more appliances within a priority center can also be assigned priorities and can be operated accordingly.

Figure 2:
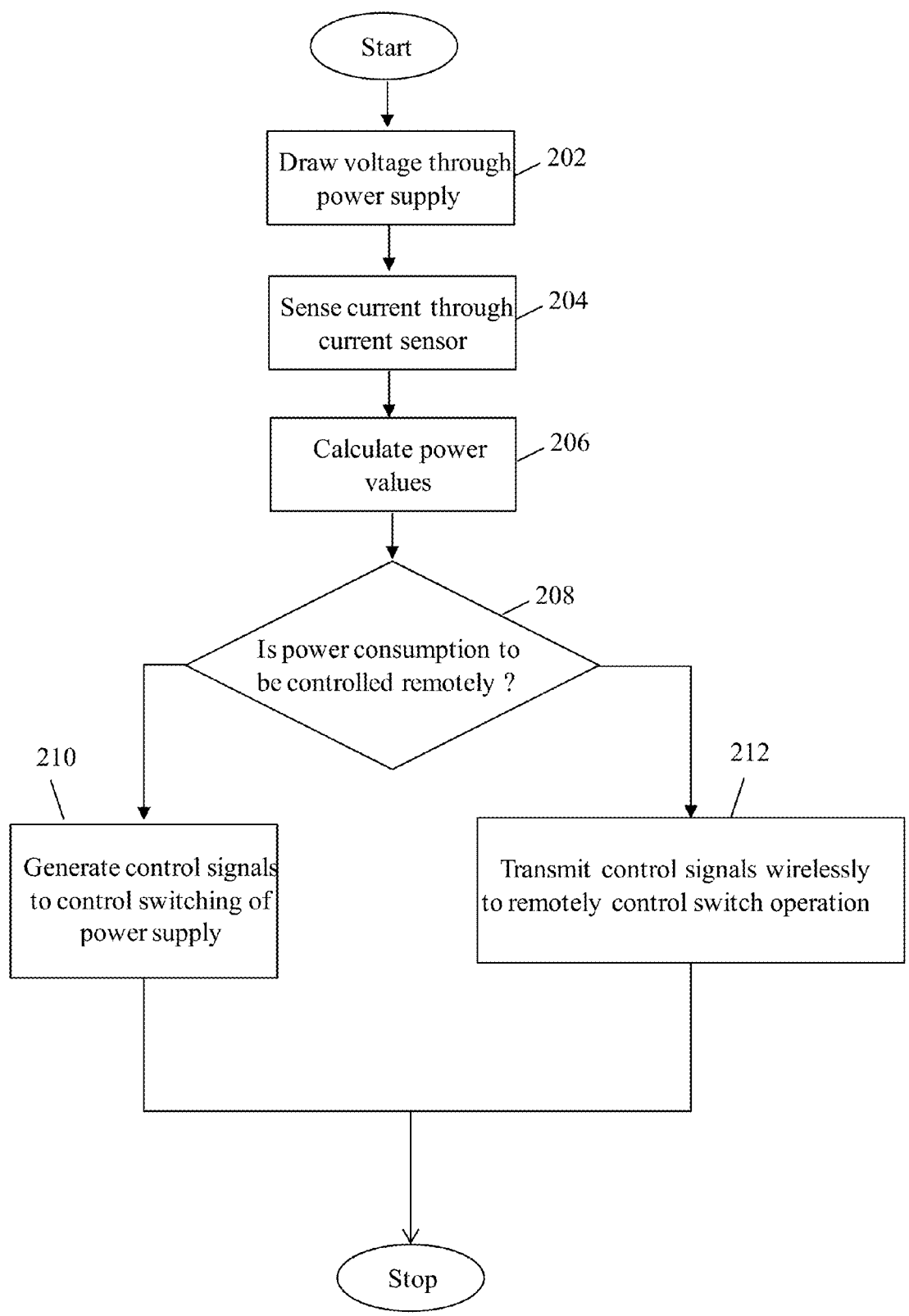
FIG. 2 is a flowchart illustrating a method for measuring, monitoring and controlling electrical power consumption, in accordance with an embodiment of the present invention.

FIG. 2 is a flowchart illustrating a method for measuring, monitoring and controlling electrical power consumption, in accordance with an embodiment of the present invention As shown in the figure, at step 202, the circuit of the present invention draws voltage from an electricity directing device such as a power socket, mains supply, an electric switchboard and the like. Thereafter, at step 204, a current sensor draws current from the power supply.

The values of voltage and current drawn from the supply are provided to a microcontroller. The microcontroller, at step 206 calculates the values of real, apparent and reactive power using the values of voltage and current.

In an embodiment of the present invention, at step 208, it is determined by a microcontroller whether power consumption has to be controlled remotely or locally. In case, power consumption is to be controlled locally, the microcontroller at step 210 uses the values of real, apparent and reactive power to generate a control signal that switches power flow through a socket on or off using the combination of an Optocoupler and a switching device. In an embodiment of the present invention, the microcontroller at step 210 transmits a control signal to a processor that controls switching of appliances connected to the socket. However, if it is determined by the microcontroller that the power consumption has to be controlled remotely, the microcontroller generates a control signal that is wirelessly transmitted, at step 212 to a mobile device that remotely control switching of appliances connected to a socket.

Figure 3:
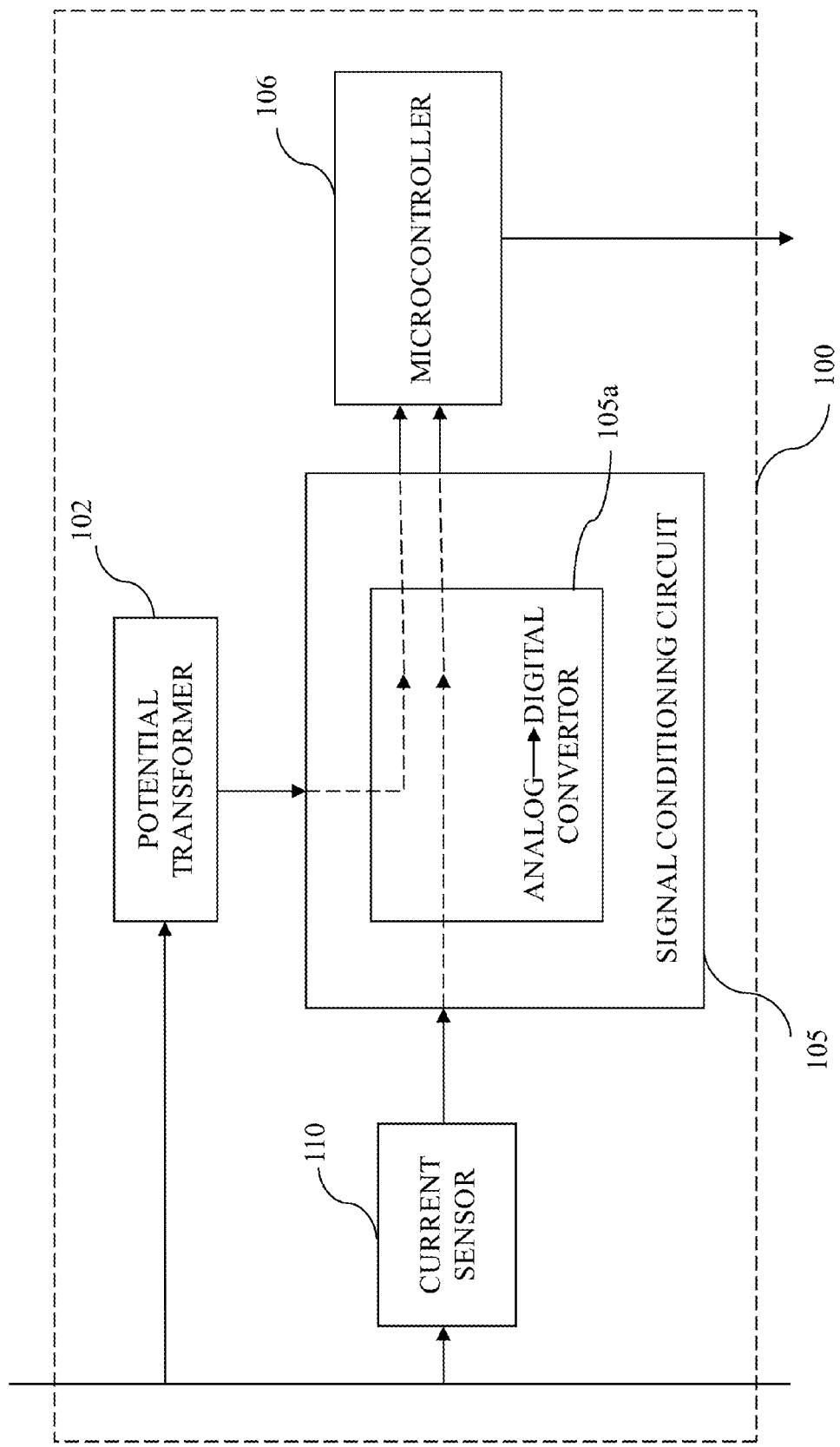
FIG. 3 illustrates a signal conditioning circuit having an Analog-to-Digital convertor provided therewithin.

FIG. 3 illustrates signal conditioning circuit 105 having an Analog-to-Digital convertor 105a provided therewithin. The Analog-to-Digital convertor 105a is configured to receive and convert the analog voltage signal received from Potential Transformer 102 and the analog current signal received from current sensor 110 to digital signals and to relay the digital signals to microcontroller 106.

Figure 4:
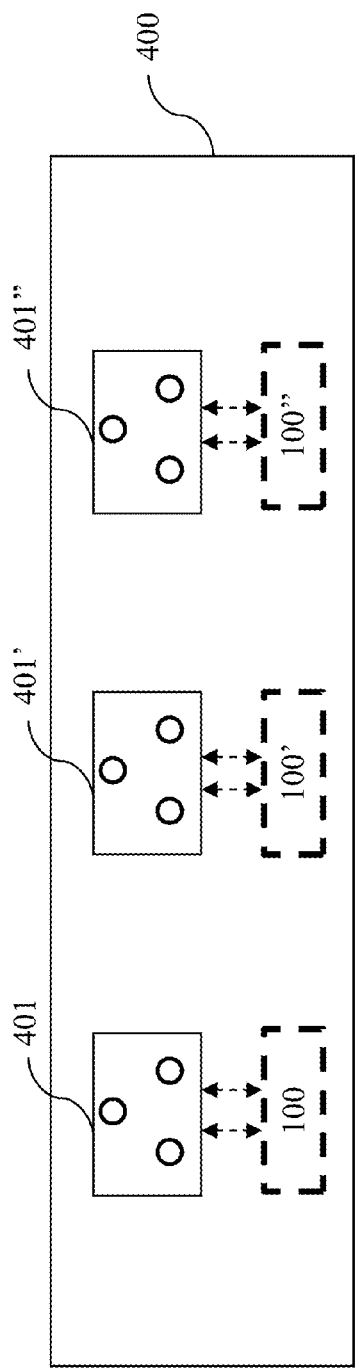
FIG. 4 illustrates an embodiment of the claimed invention wherein one or more circuits are embedded in a power strip comprising one or more electrical sockets.

FIG. 4 illustrates an embodiment of the claimed invention wherein one or more circuits 100, 100', 100" are embedded in a power strip 400 comprising one or more electrical sockets 401, 401', 401". Each circuit 100, 100', 100" is configured to measure, monitor and control electrical power flow through corresponding electrical socket 401, 401', 401".

Figure 5:
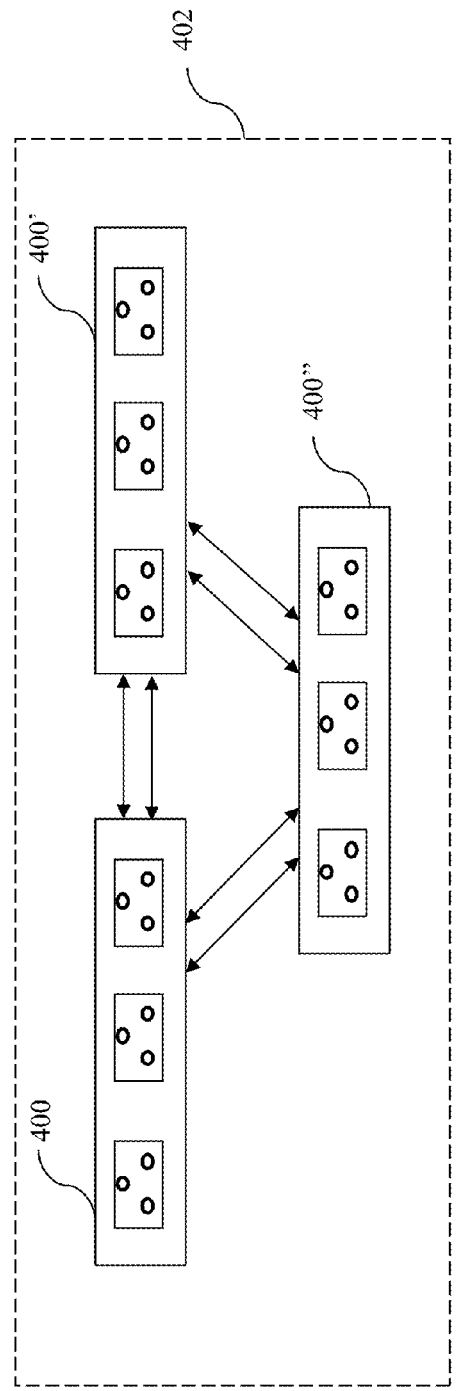
FIG. 5 illustrates an embodiment of the claimed invention where a plurality of the power strips described in connection with FIG. 4 are configured to communicate with each other for maintaining a software policy for power consumption.

FIG. 5 illustrates an embodiment where a plurality of the power strips 400, 400', 400", described in connection with FIG. 4 are configured to communicate with each other for maintaining a software policy for power consumption. In the illustrated embodiment, the plurality of power strips are all disposed within an infrastructure facility 402.

Figure 6:
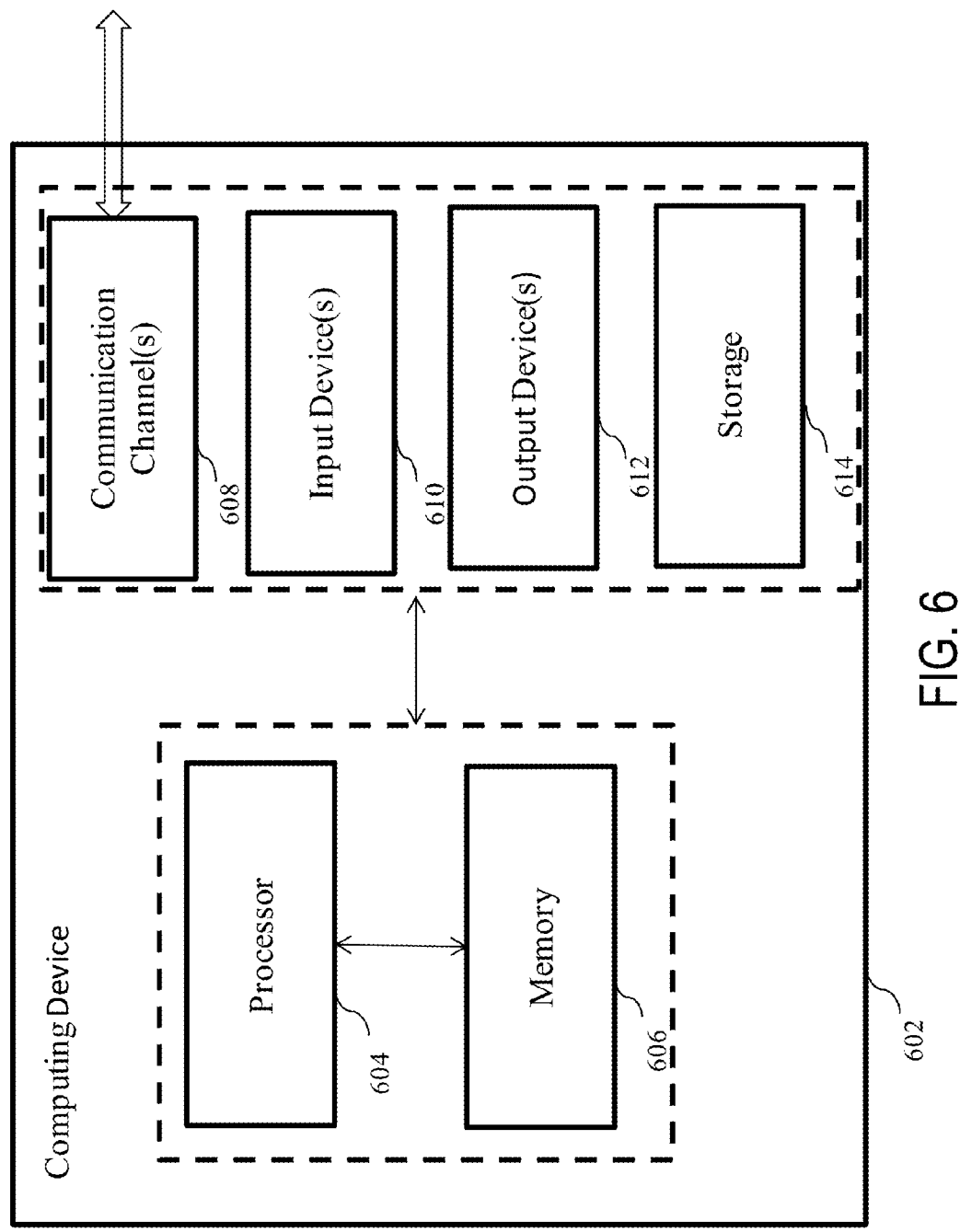
FIG. 6 illustrates an exemplary computing device in which various embodiments of the invention may be implemented.

FIG. 6 illustrates an exemplary computing device 600 in which various embodiments of the invention may be implemented. The computing device 602 comprises at-least one processor 604 and at-least one memory 606. The processor 604 executes program instructions and may be a real processor. The processor 604 may also be a virtual processor. The computing device 600 is not intended to suggest any limitation as to scope of use or functionality of described embodiments. For example, the computing device 600 may include, but not limited to, one or more of a general-purpose computer, a programmed microprocessor, a micro-controller, an integrated circuit, and other devices or arrangements of devices. In an embodiment of the present invention, the memory 606 may store software for implementing various embodiments of the present invention. The computing device 600 may have additional components. For example, the computing device 600 includes one or more communication channels 608, one or more input devices 610, one or more output devices 612, and storage 614. An interconnection mechanism (not shown) such as a bus, controller, or network, interconnects the components of the computing device 600.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

The invention claimed is:

1. A system for measuring, monitoring and controlling electrical power directed through one or more electricity directing devices, wherein the one or more electricity directing devices comprises one or more electrical sockets supplying power to one or more devices, the system comprising one or more circuits, each circuit comprising:
   a potential transformer configured to receive single phase AC voltage directed through a socket and further configured to relay the voltage, wherein relaying the AC voltage comprises stepping down the voltage using a precise value of transformation ratio;
   a current sensor configured to sense current drawn from the socket and further configured to relay the current;
   a microcontroller configured to receive analog or digital values of voltage and current corresponding to the single phase AC voltage delivered by the potential transformer and current sensed by the current sensor, wherein the microcontroller is further configured to:
      measure values of the single phase AC voltage and current provided at the socket;
      determine over one cycle of the single phase AC voltage, a cumulative sum of modulus of instantaneous power values at the socket;
      determine phase lag between the single phase AC voltage and current provided at the socket; and
      for AC voltage and current separated by a phase lag, generate a control signal terminating power flow, wherein the control signal is generated responsive to a product of (i) the cumulative sum of modulus of instantaneous power values determined over one cycle of the single phase AC voltage and (ii) a cosine value of the phase lag between the AC voltage and current exceeding a predetermined value;
   a coupling device configured to transmit the generated control signal to a switching device; and
   a switching device operationally connected to the socket and configured to terminate power flow through the socket based on the received control signal.

2. The system of claim 1, wherein digital values of voltage and current received by the microcontroller are generated by an analog to digital controller located in a signal conditioning circuit, wherein the signal conditioning circuit is operationally connected to the potential transformer and the current sensor, and is configured to condition the analog AC voltage and current in order to make it suitable for measurement and further processing by the microcontroller.

3. The system of claim 1, wherein analog values of voltage and current received by the microcontroller are delivered by a signal conditioning circuit, wherein the signal conditioning circuit is operationally connected to the potential transformer and the current sensor, further wherein the microcontroller comprises an analog to digital converter configured to convert analog values of voltage and current into digital values.

4. The system of claim 1, wherein one or more conditioning operations are performed by a signal conditioning circuit on analog AC voltage and current sensed by the potential transformer and the current sensor, further wherein the one or more conditioning operations comprises amplification, attenuation, isolation, filtering, excitation and linearization.

5. The system of claim 1, wherein calculating electrical power by the microcontroller further comprises calculating reactive power.

6. The system of claim 1 further comprising an AC/DC power supply unit configured to supply power to components of the microcontroller.

7. The system of claim 1, wherein the coupling device is an Optocoupler.

8. The system of claim 1 wherein the switching device is a TRIAC.

9. The system of claim 1, wherein the switching device is a power relay.

10. The system of claim 1, wherein the one or more circuits are embedded in a power strip comprising the one or more electrical sockets, further wherein each circuit is configured to measure, monitor and control electrical power flow through corresponding electrical socket.

11. The system of claim 10, wherein the power strip comprises a rules engine, further wherein the rules engine comprises software code containing rules identifying one or more devices to be switched off based on control signals generated by the one or more circuits.

12. The system of claim 11, wherein the rules for switching the one or more devices comprises instructions for switching different devices at different time periods during a day.

13. The system of claim 11, wherein the rules engine allocates a power budget to the power strip and switches the one or more devices in case of the electrical power exceeding the power budget threshold.

14. The system of claim 10, wherein the power strip is configured to transmit calculated values of power to a server comprising a rules engine, further wherein the server is configured to control switching of the one or more devices based on rules stored in the rules engine.

15. The system of claim 10, wherein the power strip comprises additional circuitry for switching the one or more devices through a web based interface.

16. The system of claim 1, wherein the one or more circuits are embedded in a plurality of power strips comprising the one or more electrical sockets, further wherein the plurality of power strips are configured to communicate with each other for maintaining a software policy for power consumption.

17. The system of claim 1 further comprising a centralized server operationally connected to the microcontroller and configured to receive digital values of voltage and current from the microcontroller in order to calculate a power factor value and values of real, active and reactive power.

18. The system of claim 1, wherein the microcontroller is configured to wirelessly transmit calculated power values through a wireless device, further wherein the wireless device is adapted to remotely control switching of the one or more devices through text messaging.

19. The system of claim 18 further comprising an authentication mechanism for allowing remote control of switching of the one or more devices through specific mobile device numbers.

20. The system of claim 1, wherein the microcontroller is operationally connected to a computing device configured to control switching of the one or more devices through wireline connections.

21. The system of claim 1, wherein the one or more electricity directing devices are installed in an infrastructure facility.

22. The system of claim 21, wherein the infrastructure facility is an organization comprising one or more physical regions, further wherein a priority value is assigned to each of the one or more physical regions, and wherein the switching device is configured to control power flow to electricity consuming devices within each physical region based on the priority value assigned to said physical region.

23. The system of claim 22, wherein priority values are further assigned to the one or more electricity consuming devices within a physical region for switching the one or more electricity consuming devices based on the priority values.

24. The system of claim 1, wherein the microcontroller is further configured to perform fault diagnosis on the one or more electricity receiving devices, further wherein the fault diagnosis is performed by analyzing presence of higher harmonic frequencies in the AC voltage received by the potential transformer.

25. A method for measuring, monitoring and controlling electrical power directed through one or more electricity directing devices, wherein the one or more electricity directing devices comprises one or more electrical sockets supplying power to one or more electricity consuming devices, the method comprising:
receiving single phase AC voltage through an electricity directing device;
receiving AC current through the electricity directing device;
converting values of the single phase AC voltage and current into digital values;
based on the values of the single phase AC voltage and AC current received through the electricity directing device, determining over one cycle of the single phase AC voltage, a cumulative sum of modulus of instantaneous power values at said electricity directing device;
determining phase lag between the single phase AC voltage and current provided at the electricity directing device; and
for AC voltage and current separated by a phase lag, generating a control signal terminating power flow, wherein the control signal is generated responsive to a product of (i) the cumulative sum of modulus of instantaneous power values determined over one cycle of the single phase AC voltage and (ii) a cosine value of the phase lag between the AC voltage and current provided at the socket exceeding a predetermined value.

26. The method of claim 25, wherein the generated control signals are transmitted wirelessly to enable remote control of switching of the one or more devices.

27. The method of claim 25, wherein the generated control signals are provided to a computing device for physically controlling switching of the one or more devices.

* * * * *